(12) United States Patent  
Huber et al.

(10) Patent No.: US 9,926,040 B2
(45) Date of Patent: Mar. 27, 2018

(54) MANEUVERING SYSTEM FOR MOTOR VEHICLES

(71) Applicant: Bayerische Motoren Werke Aktiengesellschaft, Munich (DE)

(72) Inventors: Michael Huber, Mauern (DE); Karl Pongratz, Moosburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/873,656

(22) Filed: Oct. 2, 2015

(65) Prior Publication Data

US 2016/0023715 A1    Jan. 28, 2016

Related U.S. Application Data

(63) Continuation of application No. PCT/EP2014/054557, filed on Mar. 10, 2014.

(30) Foreign Application Priority Data

Apr. 3, 2013 (DE) .................. 10 2013 205 829

(51) Int. Cl.
   *B62M 7/00* (2010.01)
   *B62M 23/02* (2010.01)
   (Continued)

(52) U.S. Cl.
   CPC ............... *B62M 23/02* (2013.01); *B60K 6/26* (2013.01); *B62M 7/00* (2013.01); *B62M 17/00* (2013.01);
   (Continued)

(58) Field of Classification Search
   CPC ........ B62M 23/02; B62M 7/00; B62M 17/00; B60K 2006/268; B60K 6/26; B62K 2204/00
   See application file for complete search history.

(56) References Cited

U.S. PATENT DOCUMENTS 3,211,249 A * 10/1965 Papst .................. B60K 5/04  
                                                        180/65.25  
4,135,453 A *  1/1979 Koch .................. B61C 9/52  
                                                        105/108  
(Continued)

FOREIGN PATENT DOCUMENTS

CN      2299014 Y    12/1998  
CN    200971151 Y    11/2007  
(Continued)

OTHER PUBLICATIONS

International Search Report (PCT/ISA/210) issued in PCT Application No. PCT/EP2014/054557 dated Jul. 14, 2014, with English translation (six (6) pages).

(Continued)

*Primary Examiner* — Tony H Winner  
(74) *Attorney, Agent, or Firm* — Crowell & Moring LLP

(57) ABSTRACT

A maneuvering system is provided for single- or multi-tracked vehicles. The system includes an electric motor and an output system which can be coupled to a vehicle transmission so that with the help of the electric motor the vehicle can be moved at least backwards. The electric motor is connected to the output system by a flexible shaft or a drive shaft.

15 Claims, 1 Drawing Sheet

(51) Int. Cl.
*B62M 17/00* (2006.01)
*B60K 6/26* (2007.10)

(52) U.S. Cl.
CPC .... *B60K 2006/268* (2013.01); *B62K 2204/00* (2013.01); *Y10S 903/902* (2013.01)

(56) References Cited

U.S. PATENT DOCUMENTS

| | | | |
|---|---|---|---|
| 4,325,265 A | 4/1982 | Wakatsuki et al. | |
| 4,546,841 A * | 10/1985 | Sipiano | A63C 17/26 180/181 |
| 4,763,538 A * | 8/1988 | Fujita | B62K 23/06 123/179.25 |
| 4,869,332 A * | 9/1989 | Fujita | B62M 23/00 180/219 |
| 4,923,028 A | 5/1990 | Yamashita et al. | |
| 4,974,695 A | 12/1990 | Politte | |
| 5,048,632 A * | 9/1991 | Battel | A63C 17/12 180/181 |
| 5,069,304 A * | 12/1991 | Mann | B62M 7/00 180/221 |
| 5,226,501 A * | 7/1993 | Takata | B60L 15/2063 180/19.1 |
| 5,765,671 A * | 6/1998 | Endo | B60L 11/1874 192/48.2 |
| 6,158,543 A * | 12/2000 | Matsuto | B60K 6/36 180/220 |
| 6,245,086 B1 * | 6/2001 | Storz | A61B 17/32 606/180 |
| 6,428,050 B1 * | 8/2002 | Brandley | A63C 17/12 280/11.19 |
| 6,457,381 B1 * | 10/2002 | Nonaka | B60K 31/042 74/342 |
| 7,156,197 B2 * | 1/2007 | Sanchez | B62M 23/02 180/219 |
| 7,478,692 B2 * | 1/2009 | Taue | B60L 15/2045 180/65.21 |
| 7,610,979 B1 * | 11/2009 | Dykowski | B62K 5/027 180/210 |
| 8,555,739 B2 * | 10/2013 | Ieda | F16H 63/14 74/335 |
| 8,919,479 B1 * | 12/2014 | Langlands | B62M 11/04 180/219 |
| 2006/0032688 A1 * | 2/2006 | Sanchez | B62M 23/02 180/219 |
| 2008/0011527 A1 * | 1/2008 | Howell | B60G 3/01 180/65.1 |
| 2009/0200096 A1 | 8/2009 | Pittman | |
| 2010/0077884 A1 | 4/2010 | Ono et al. | |
| 2011/0247888 A1 * | 10/2011 | Kohlbrenner | B62M 6/70 180/206.7 |
| 2012/0325571 A1 * | 12/2012 | Nomura | B60K 6/48 180/220 |

FOREIGN PATENT DOCUMENTS

| | | |
|---|---|---|
| DE | 83 36 707.1 | 6/1984 |
| DE | 36 41 446 A1 | 7/1987 |
| DE | 10 2009 043 326 A1 | 4/2010 |
| DE | 10 2009 043 326 B4 | 2/2011 |
| JP | 62-178493 A | 8/1987 |
| JP | 63-232092 A | 9/1988 |
| JP | 6-183388 A | 7/1994 |

OTHER PUBLICATIONS

German Search Report issued in counterpart German Application No. 10 2013 205 829.2 dated Jan. 23, 2014, with partial English translation (ten (10) pages).

Japanese Office Action issued in Japanese counterpart application No. 2016-505747 dated May 10, 2017, with English translation (Ten (10) pages).

Chinese Office Action issued in Chinese counterpart application No. 201480015556.6 dated Apr. 19, 2017, with English translation (Fifteen (15) pages).

* cited by examiner

MANEUVERING SYSTEM FOR MOTOR VEHICLES

CROSS REFERENCE TO RELATED APPLICATIONS

This application is a continuation of PCT International Application No. PCT/EP2014/054557, filed Mar. 10, 2014, which claims priority under 35 U.S.C. § 119 from German Patent Application No. 10 2013 205 829.2, filed Apr. 3, 2013, the entire disclosures of which are herein expressly incorporated by reference.

BACKGROUND AND SUMMARY OF THE INVENTION

The invention relates to a maneuvering system for single-track or multi-track vehicles, comprising an electric motor and an output system which can be coupled to a transmission of the vehicle in such a way that the vehicle can be moved at least backwards by means of the electric motor.

In general, motorcycles have an internal combustion engine as a drive, which internal combustion engine is connected to a transmission. The transmission comprises only forward speeds, and therefore motorcycles can be driven only in the forward direction by way of the internal combustion engine. If motorcycles must be moved backwards, which can be necessary, for example, during maneuvering, this generally must be accomplished by use of human force. In this case, the motorcycle is pushed in the backward direction. Difficulties arise particularly if the motorcycle has a high curb weight or if the motorcycle hits an obstacle, such as curbs, dips, or the like, with at least one of its wheels. A downward slope of the roadway also can result in the human force being insufficient to produce a backward motion of the motorcycle.

In order to avoid this problem, motorcycles having a high curb weight are provided with a transmission having a reverse speed in the prior art. A vehicle backward-driving device, wherein by means of the starter motor, which is typically used to start the combustion engine, a manual transmission is driven in such a way that a backward motion of the motorcycle is produced, is known from DE 10 2009 043 326 B4. An alternative backward-driving auxiliary transmission for motorcycle power trains is known from G 83 36 707.1. However, such systems have a high number of components. Furthermore, such systems cannot be retrofitted and thus are limited to use on a specific motorcycle model.

Proceeding from this prior art, the problem addressed by the present invention is that of providing a simplified maneuvering system by which the disadvantages of the prior art are overcome. Furthermore, the problem addressed by the invention is that of providing a maneuvering system having a reduced number of components, which maneuvering system is distinguished in that the maneuvering system can be retrofitted especially easily on a large number of different motorcycle variants.

In order to solve this problem, the invention provides a maneuvering system for single-track or multi-track vehicles, comprising an electric motor and an output system, which can be coupled to a transmission of the vehicle in such a way that the vehicle can be moved at least backwards by way of the electric motor. Furthermore, the electric motor can be connected to the output system by a flexible shaft or a Cardan shaft. Within the meaning of the invention, single-track vehicles are motorcycles and motor scooters. Multi-track vehicles have two wheels arranged parallel to each other on the front axle and/or on the rear axle or runners, such as snowmobiles, trikes, and quads. Although the invention is intended particularly for use for heavy motorcycles, it can also be used without restrictions for lighter motorcycles to motor scooters, which today are also available in variants that have a relatively high curb weight. High variability with regard to the package requirements of the motorcycle can be generated by using a flexible shaft or a Cardan shaft as the connecting element between the electric motor and the output system. Within the meaning of the invention, flexible shafts are pliable shafts known in use as speedometer cables or from convertible tops. These shafts have an outer protective sheath, inside of which a wire shaft can rotate about the longitudinal axis and thereby transmit a rotational motion from a first end of the shaft to a second end of the shaft.

Furthermore, an output shaft of the electric motor can be connected to the pliable shaft by way of a gear pair. This offers the advantage that a first transmission stage having a speed increase or speed reduction can be realized directly in the drive unit, which includes the electric motor and a first end of the pliable shaft.

Furthermore, the output unit can have a first transmission stage and a second transmission stage, wherein a torque can be transmitted from the flexible shaft to the first transmission stage, from the first transmission stage to the second transmission stage, and from the second transmission stage to an output shaft. Thus, a speed increase or speed reduction can be realized from the second end of the pliable shaft to the vehicle transmission.

The maneuvering system can also be coupled to and/or decoupled from the transmission of the vehicle by way of an actuator. Such actuators are electromechanical servomotors or solenoid valves and can be flange-mounted to the drive unit or installed integrally with the unit.

In a first alternative of the invention, the electric motor can be a separate electric motor, wherein the direction of rotation of the pliable shaft also changes in accordance with the driving direction of the electric motor. Thus, the motorcycle can perform a forward motion or a backward motion.

In a second alternative of the invention, the electric motor is simultaneously the starter motor, which is also used to start a combustion engine of the vehicle. This offers the advantage that the starter, which is already provided on the internal combustion engine, can be used as the electric motor, whereby the number of components used for the maneuvering system is further reduced. A direct-current motor is typically used as the starter motor. Because the electrical ground terminal is formed by the body structure of the motorcycle, the polarity and thus the direction of rotation of the starter motor cannot be changed. However, according to the invention, the starter motor should be able to rotate in both directions of rotation of the output spindle of the starter motor. In this case, the ground terminal must be separate and must not extend via the body structure of the motorcycle.

Additionally or alternatively, a function lock can be provided, which prevents coupling of the maneuvering system to the transmission of the vehicle if the transmission of the vehicle is not in a neutral position and allows coupling of the maneuvering system to the transmission of the vehicle if the transmission is in the neutral position. Thus, it can be ensured that a driver cannot activate the maneuvering system if one of the forward speeds is engaged at the transmission of the vehicle. A further criterion for the locking of the maneuvering system can be the speed of the motorcycle. If the motorcycle is moving forward at a speed above a predetermined threshold value, such as 6 km/h or preferably 3 km/h or especially preferably 1.6 km/h, the activation of the maneuvering system is prevented by the function lock even if the transmission of the vehicle is in a neutral position. Thus, it can be prevented that the maneuvering system is incorrectly activated during shifting operations in which the transmission is briefly in a neutral position.

The provision of a separate electric motor also provides the advantage that the maneuvering system can be operated also while the internal combustion engine of the motorcycle is stationary. This is not possible if the starter motor is used as the drive motor of the drive unit of the maneuvering system, because the starter motor would always start the internal combustion engine.

The function lock acts mechanically or electrically on the actuator to enable or prevent coupling to the transmission of the vehicle.

Furthermore, the output system can be brought into connection with the transmission of the vehicle by way of a coupling system, in particular a dog clutch or face teeth, which coupling system acts on the output gear of the second transmission stage.

Furthermore, the first transmission stage of the output system can be designed as a worm-gear stage. The worm-gear stage offers the advantage of an especially high rotational-speed jump and torque jump in the maneuvering system, wherein at the same time a minimum amount of packaging space is required therefor.

In a further aspect, the invention relates to single-track or multi-track vehicles, particularly motorcycles, including the novel maneuvering system.

The advantages of the present invention are briefly summarized below.

By using a flexible shaft or a worm-gear stage or by combining a flexible shaft and a worm-gear stage, the packaging space for the maneuvering system can be reduced to a minimum and the maneuvering system can be installed on a large number of different motorcycle types with great flexibility. Thus, the maneuvering system can also be offered as an accessory and retrofitted as a separate unit. This also increases the degree of freedom in the production of the motorcycle, because motorcycles thus can be offered with or without backward-driving assistance.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
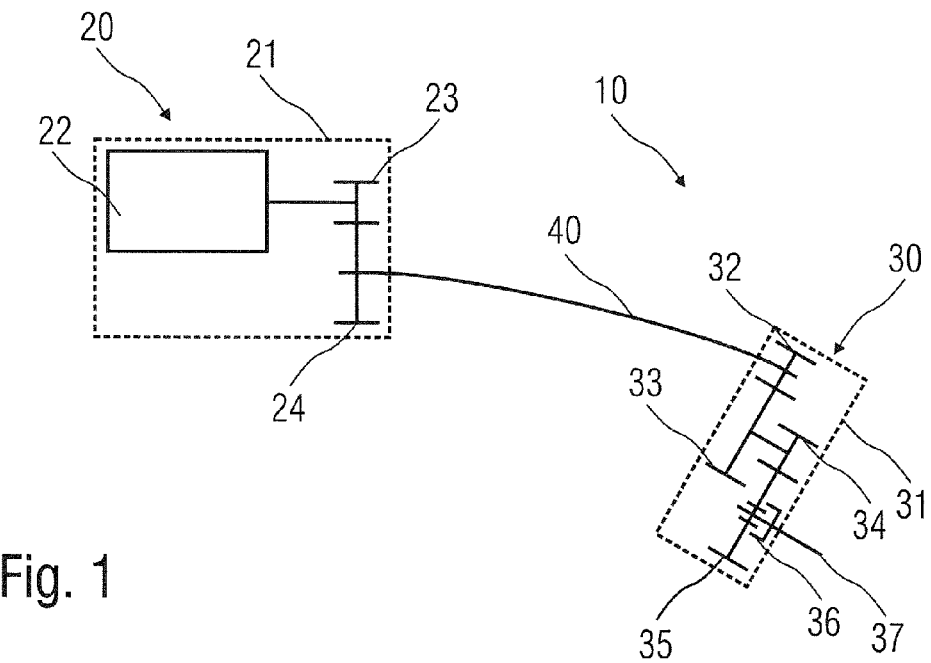
FIG. 1 is a schematic diagram showing the principle structure of a maneuvering system according to an embodiment of the invention.

The principle structure of the maneuvering system 10 should first be explained below on the basis of FIG. 1. As already described above, the maneuvering system is intended for motorcycles, motor scooters, tikes, or quads, i.e., essentially single-track or multi-track vehicles that have an internal combustion engine. The internal combustion engine is connected to a drive wheel by way of a mechanical transmission and can produce a forward motion of the vehicle. The maneuvering system 10 includes a drive system 20 and an output system 30. The output system 30 is designed in such a way that it can be fastened to the mechanical transmission of the vehicle. The drive unit 20 can also be fastened to the transmission or to another unit of the vehicle, such as to the internal combustion engine or to the chassis.

The drive unit 20 has a housing 21, which contains the electric motor 22. The electric motor 22 is connected to a gear 23 by way of the output shaft of the electric motor. The gear 23 meshes with a second gear, which is arranged on a first end of a pliable shaft 40. The electric motor 22, the first gear 23, and the second gear 24 are arranged in the housing 21, wherein the pliable shaft 40 exits the housing 21 through a passage opening. The electric motor 22 is driven by electrical energy and produces a rotational motion at the output shaft of the electric motor, which output shaft in turn causes the pliable shaft 40 to move rotationally via the gears 23 and 24. The rotational motion of the pliable shaft 40 is transmitted to the output unit 30. The output unit 30 includes a housing 31, in which a first transmission stage and a second transmission stage are arranged. The first transmission stage includes a worm 32 and a spur gear 33. The rotational motion of the pliable shaft is transmitted from the worm 32 to the spur gear 33. By means of a common shaft of the spur gear 33 and of a first spur gear 34 of the second transmission stage, the rotation is transmitted to the second transmission stage and thus to the second spur gear 35 of the second transmission stage. This second spur gear 35 can be coupled to the output shaft 37 by a coupling system 36. The coupling system 36 can be designed as a dog clutch or as face teeth and is suitable for connecting the output shaft 37 to the second gear 35 of the second transmission stage in a rotationally fixed manner.

Figure 2:
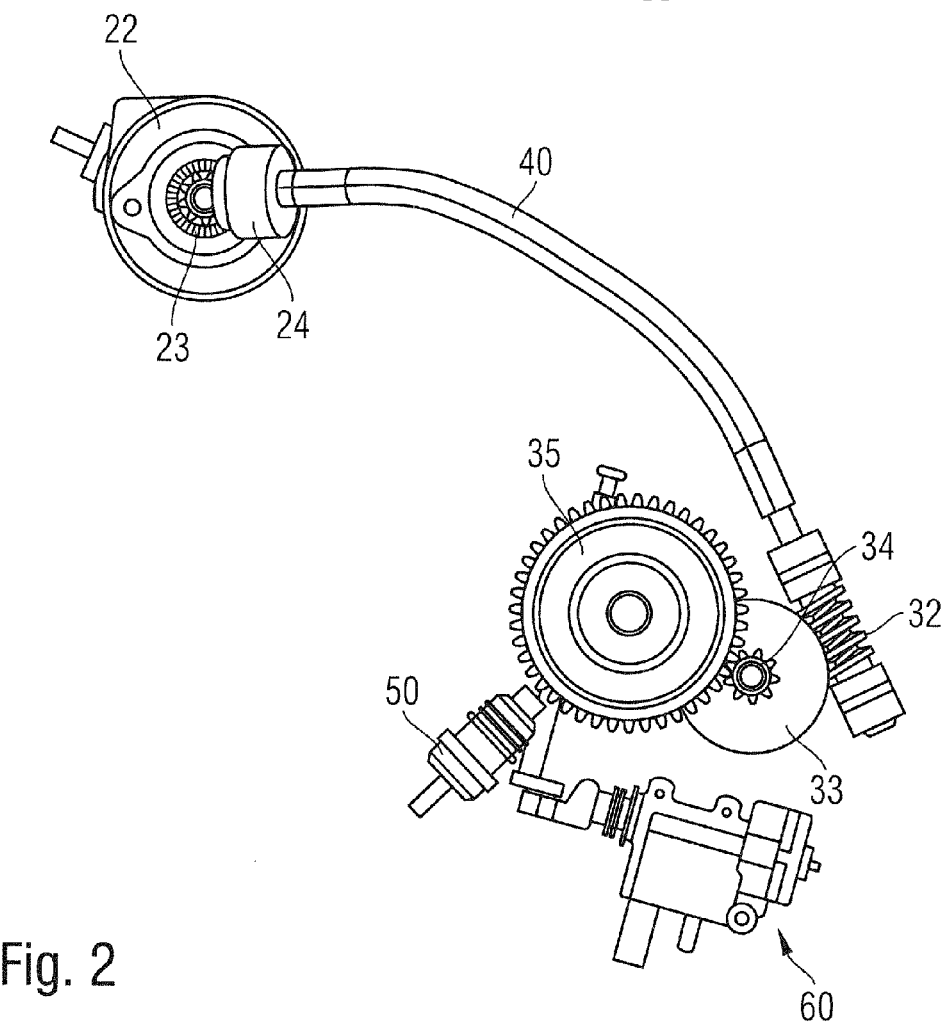
FIG. 2 is a side view of a maneuvering system in schematic representation.

In FIG. 2, a side view of the maneuvering system is shown without the housing. The same reference signs as in FIG. 1 number the same components. The actuator 60, by which the second spur gear 35 of the second transmission stage can be brought into engagement with the output shaft, can be seen in FIG. 2. This actuator is designed as a cylindrical solenoid, for example. Furthermore, a rotational-speed sensor 50 is also provided for determining the output rotational speed of the maneuvering system. The maneuvering system is connected to an intermediate shaft of the transmission by way of the output shaft 37.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A maneuvering system for single-track or multi-track vehicles, comprising:
    an electric motor;
    an output system connected to the electric motor by a flexible shaft or a Cardan shaft, the output system configured to couple to and decouple from a transmission that forward drives at least one wheel of the vehicle, wherein coupling the output system to the transmission enables the electric motor to provide a backwards driving torque to the at least one wheel via the flexible or Cardan shaft, the output system and the transmission.

2. The maneuvering system according to claim 1, further comprising:

a gear pair connecting an output shaft of the electric motor to the flexible shaft or the Cardan shaft.

3. The maneuvering system according to claim 2, wherein the output system comprises first and second transmission stages, a torque is transmitted from the flexible shaft or the Cardan shaft to the first transmission stage, from the first transmission stage to the second transmission stage, and from the second transmission stage to an output shaft of the maneuvering system.

4. The maneuvering system according to claim 1, wherein the output system comprises first and second transmission stages, a torque is transmitted from the flexible shaft or the Cardan shaft to the first transmission stage, from the first transmission stage to the second transmission stage, and from the second transmission stage to an output shaft of the maneuvering system.

5. The maneuvering system according to claim 4, wherein the first transmission stage of the output system is a worm-gear stage.

6. The maneuvering system according to claim 1, further comprising:
an actuator configured to couple and decouple the maneuvering system from the transmission of the vehicle.

7. The maneuvering system according to claim 6, further comprising:
a function lock configured to prevent coupling of the maneuvering system to the transmission of the vehicle if the transmission is not in a neutral position and allowing coupling of the maneuvering system to the transmission if the transmission is in the neutral position.

8. The maneuvering system according to claim 7, wherein the function lock acts mechanically or electrically on the actuator.

9. The maneuvering system according to claim 1, further comprising:
a coupling system by which the output system is brought into connection with the transmission of the vehicle.

10. The maneuvering system according to claim 9, wherein the coupling system comprises a dog clutch or face teeth.

11. The maneuvering system according to claim 1, wherein the electric motor is a starter motor for a combustion engine of the vehicle.

12. A vehicle, comprising:
a maneuvering system, comprising:
an electric motor;
an output system connected to the electric motor by a flexible shaft or a Cardan shaft, the output system configured to couple to and decouple from a transmission that forward drives at least one wheel of the vehicle, wherein coupling the output system to the transmission enables the electric motor to provide a backwards driving torque to the at least one wheel via the flexible or Cardan shaft, the output system and the transmission.

13. The vehicle according to claim 12, wherein the vehicle is a single-track vehicle.

14. The vehicle according to claim 13, wherein the single-track vehicle is a motorcycle.

15. The vehicle according to claim 12, wherein the vehicle is a multi-track vehicle.

* * * * *